United States Patent [19]

Dean et al.

[11] 4,280,263
[45] Jul. 28, 1981

[54] HEAT FUSER ROLL AND METHOD OF MANUFACTURE

[75] Inventors: Homer B. Dean; Ballard T. Mahurin, both of Morgan Hill, Calif.

[73] Assignee: International Business Machines Corporation, Armonk, N.Y.

[21] Appl. No.: 7,263

[22] Filed: Jan. 29, 1979

Related U.S. Application Data

[63] Continuation of Ser. No. 861,077, Dec. 14, 1977, abandoned.

[51] Int. Cl.³ ............................................. B21B 31/08
[52] U.S. Cl. ......................................... 29/132; 118/60; 427/54.1; 428/447
[58] Field of Search ................. 427/54, 387, 178, 194, 427/375, 331; 29/132; 118/60; 432/60, 228; 428/447

[56] References Cited

U.S. PATENT DOCUMENTS

| | | | |
|---|---|---|---|
| 3,767,457 | 10/1973 | Hubbard, Jr. et al. | 427/54 X |
| 3,848,305 | 11/1974 | Jachimiak | 29/132 |
| 3,987,530 | 10/1976 | Atkin et al. | 427/387 X |
| 4,016,334 | 4/1977 | Collins et al. | 427/54 X |
| 4,025,407 | 5/1977 | Chang et al. | 204/159.14 |
| 4,075,390 | 2/1978 | Murphy | 427/194 X |
| 4,146,659 | 3/1979 | Swift et al. | 427/194 |

FOREIGN PATENT DOCUMENTS 51-00541  1/1976  Japan ............................. 427/54

Primary Examiner—Ronald H. Smith
Assistant Examiner—Thurman K. Page
Attorney, Agent, or Firm—Otto Schmid, Jr.

[57] ABSTRACT

A heat fuser roll and the method of manufacture thereof. The roll comprises a deformable layer on a base member and the deformable layer is produced by coating the base member with a silicone rubber material, curing the silicone rubber material and treating the roll by irradiating its surface with a predetermined level of ultra violet radiation for a predetermined time to produce an improved silicone rubber deformable layer.

12 Claims, 8 Drawing Figures

HEAT FUSER ROLL AND METHOD OF MANUFACTURE

This is a continuation of application Ser. No. 861,077 filed Dec. 14, 1977 now abandoned.

BACKGROUND OF THE INVENTION

This invention relates to improvements in heat fusing apparatus and more particularly to heat fusing apparatus in which a heated roll is brought into contact with an image formed of a resinous powder to heat the powder and fix the powder image to a sheet of paper.

Contact fusing apparatus is known in the prior art. However, contact fusing has the disadvantage that "offset" may occur. Offset is caused by part of the image sticking to the surface of the contact fusing device so that when the next sheet comes into contact with the fusing device the image partially removed from the first sheet is transferred to the second sheet. This offset problem has been overcome in commercial machines by fabricating the outer surface of the heated roll with a resilient material such as silicone rubber which, when operated with a deformable backup roll, will produce offset-free operation without the use of any offset-preventing liquid such as silicone oil. This fusing roll has had sufficient useful life so that it is suitable for use in a system which utilizes high process speeds in which the components of the system are required to have maintenance free operation for a long period of time. However, in actual service, there is a condition where the surface of the heated roll collects toner and paper particles or dust over a period of operating time which results in thoroughly contaminating the heated roll's silicone rubber surface with toner. This condition, which has been known as a "toner ring," causes machine malfunctions in the form of a loss of information on the printed sheet, causes paper to stick to and wrap around the hot roll and can cause data insertion on the printed page.

SUMMARY OF THE INVENTION

It is therefore the principle object of this invention to produce a fuser apparatus which is capable of fusing images without offset at a high process speed which produces maintenance free operation for long periods of time and in which the production of "toner rings" is inhibited for long periods of time.

It is a further object of this invention to provide an improved method for manufacturing a fuser roll having improved properties.

Briefly, according to the invention, apparatus and a method is provided for manufacturing an improved fuser roll. The roll is coated with a suitable silicone rubber material and the coating is cured. The roll is then treated by rotating the roll about its axis while simultaneously irradiating its surface with a predetermined level of ultra-violet (UV) radiation for a predetermined time. Although it was known in the art to use UV radiation to fully cure polymer materials, it was unexpectedly observed that the post-cure treatment with UV according to the invention produced not only greatly improved resistance to toner ring formation, but also resulted in much lower wear rates.

DESCRIPTION OF THE PREFERRED EMBODIMENT

Figure 1:
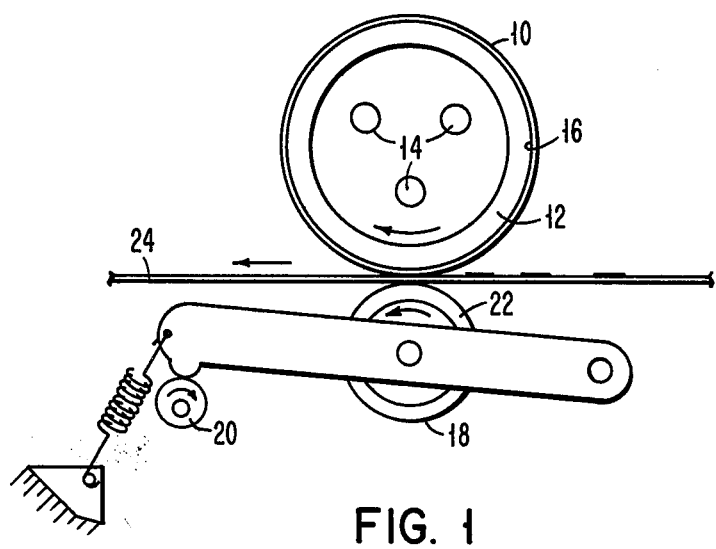
FIG. 1 shows a roll embodiment of the fusing apparatus embodying the present invention.

In the embodiment shown in FIG. 1, the fusing apparatus comprises a heated member 10 in the shape of a roller which comprises a heat conducting base member 12 having infra-red lamps 14 disposed therein and having a deformable layer 16 of an insulating high temperature material such as one comprising silicone rubber on its outer surface. The power to the lamps 14 will vary depending upon the speed of the paper web 24 through the fusing station and the desired temperature for the hot roll surface temperature. The base member comprises a tube 12 made from a suitable material such as copper or aluminum which is good heat conductor. However, since high temperature materials such as silicone rubber are heat insulating materials, the thickness of the deformable layer 16 must be kept thin and, in a practical embodiment, this thickness would normally be ten mils or less. The backup element 18 is also in the shape of a roller, and the roller is pushed against the heated roll with a meshing force supplied in the illustrated embodiment by cam means 20. The backup element is also formed of a high temperature elastomer 22 such as one comprising silicone rubber.

Heated roll 10 is driven by a suitable motor and when backup roll 18 is meshed with the heated roll, the pressure causes paper web 24 to be driven through the hot roll fuser and to fuse and permanently fix the toner image to sheet 24. Paper web 24 may comprise roll paper, separate sheets of paper or fan-fold paper sheets. The fan-fold paper sheets produce greater wear on the deformable layer due to the presence of the tractor holes in the fan-fold paper.

According to the present invention, an improved method for manufacturing a fuser roll comprising tube 12 and deformable layer 16 is disclosed which has a greatly increased useful life. The fuser roll should have the properties at temperatures suitable for fusing toner, of release from the toner after fusing, wear resistance to fan-fold paper especially at tractor holes, acceptable heat transfer and ability to elastically deform under load to give contact with toner during fusing. The time during which the fuser roll retains these properties is its useful life.

These properties can be obtained according to our invention by forming deformable layer 16 with a suitable silicone rubber material. The silicone rubber material is then cured by any one of several suitable curing methods known in the art. One suitable curing method is described and claimed in U.S. Pat. No. 3,987,530 to Atkin et al which patent is assigned to the assignee of the present invention. In this curing method, the base member is coated with a silicone gum material containing no curing agent, and then treated by heating in an inert atmosphere to a temperature at which substantial cross-linking occurs for a predetermined time to produce a tough long-wearing silicone rubber deformable layer.

Figure 3:
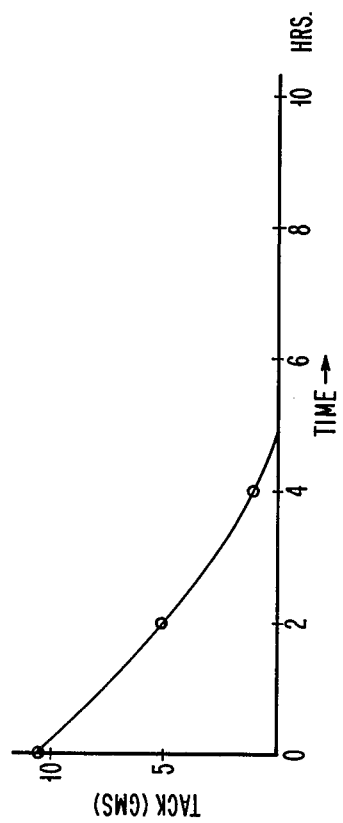
FIG. 3 is a plot of fuser roll tack vs. time of exposure to a low pressure UV source.
Figure 4:
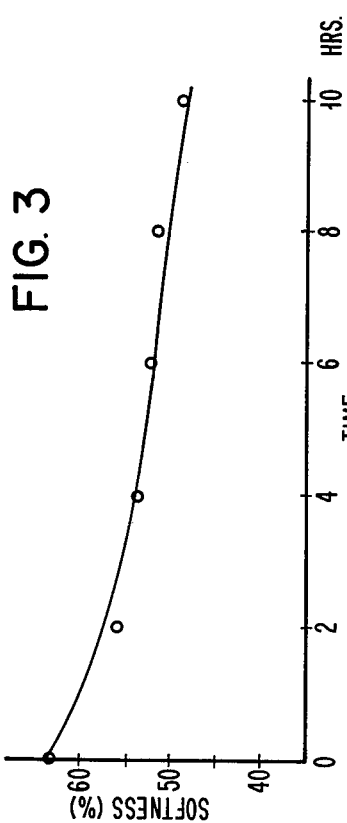
FIG. 4 is a plot of fuser roll softness vs. time of exposure to a low pressure UV source.
Figure 5:
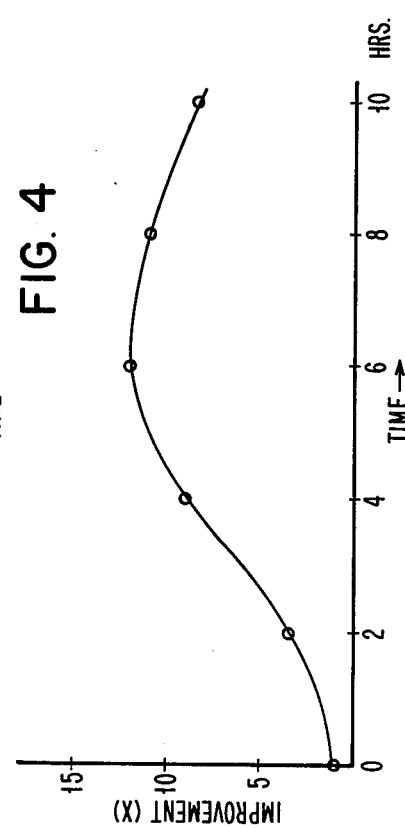
FIG. 5 is a plot of typical improvement in retardation of fuser ring growth vs. time of exposure to a low pressure UV source.

The cured silicone rubber deformable layer 16 on tube 12 is then subjected to a treating step which comprises exposing the roll to a predetermined level of ultra-violet radiation for a predetermined time. The level of ultra-violet radiation and the time of exposure is determined by considering not only the effect of the radiation in the formation of toner rings, but also the effect on other characteristics of the roll which define the useful life of the roll. FIGS. 3, 4 and 5 relate to rolls treated with a low-level ultra-violet radiation. Thin sections of silicone rubber tend to have a tacky surface even when fully cured, by all the conventional tests, such as modulus of elasticity, tensile strength, elongation and cross-link density. FIG. 3 gives the relation of the measured tack of the roll with various treatment times with the low level UV. Tack is a measure of the stickiness of the roll and is measured by placing a standard size sheet in contact with the roll and measuring the force in grams required to peel the sheet off the roll. The tack goes to zero by about a six hour exposure for the low level UV exposure.

The softness of a roll is defined as the ratio of the indentation of a standard probe to the total thickness of the silicone rubber coating. FIG. 4 shows the relation of softness of the roll of FIG. 3 to time of exposure. It can be noted from FIG. 4 that the softness decreases (i.e., roll becomes harder) with increased exposure. It can be seen that the softness remains above 50% until about 9 hours of treatment. FIG. 5 shows the improvement in number of copies produced before onset of toner rings for different times of exposure to the low level UV radiation. FIGS. 3, 4 and 5 show that a treatment time of about 6 hours appears to be optimum.

Figure 6:
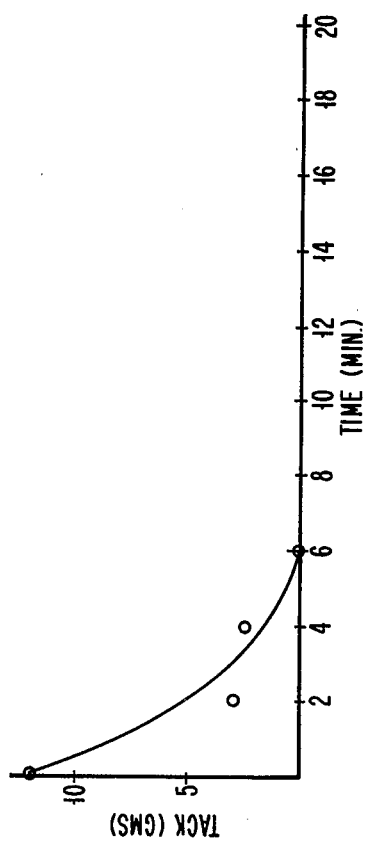
FIG. 6 is a plot of fuser roll tach vs. time of exposure to a medium pressure UV source.
Figure 7:
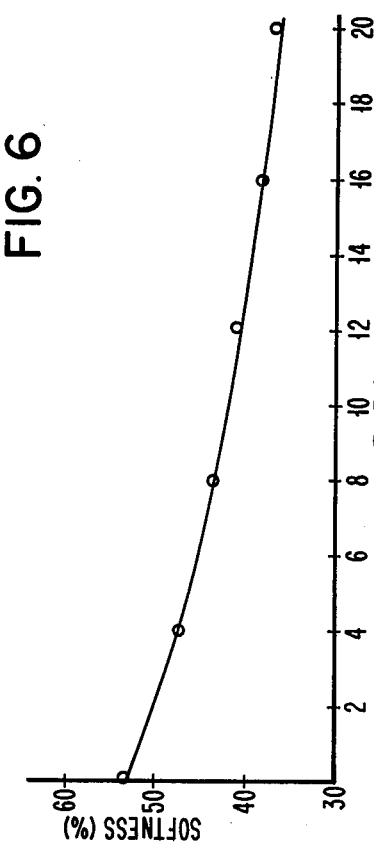
FIG. 7 is a plot of fuser roll softness vs. time of exposure to a medium pressure UV source.
Figure 8:
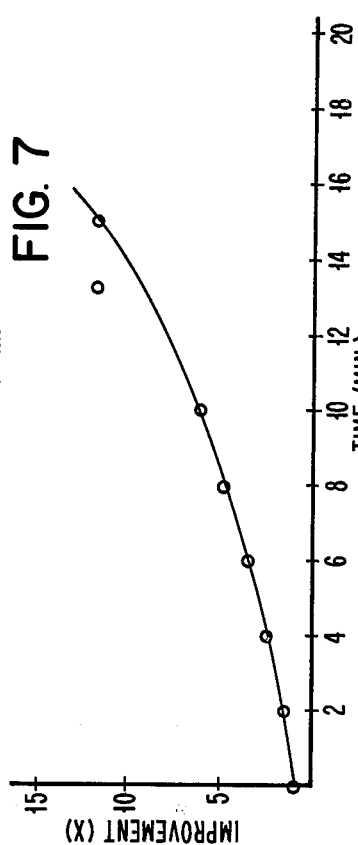
FIG. 8 is a plot of typical improvement in retardation of fuser ring growth vs. time of exposure to a medium pressure UV source.

FIGS. 6, 7 and 8 show the results of treatment with a medium pressure mercury arc lamp. The treatment times are much less than with the low pressure radiation as can be seen by the tack curve in FIG. 6 in which the tack goes substantially to zero after about 6 minutes treatment. However, the softness is decreased more rapidly with this treatment. It can be seen that the optimum time for this level of UV radiation is a few minutes, although the improvement in performance is not as great as was the case with the low level exposure.

The low level exposure is the preferred treatment due to the level of improvement achieved. However, in some cases a lower level of improvement may be adequate in view of the difference in processing time.

Figure 2:
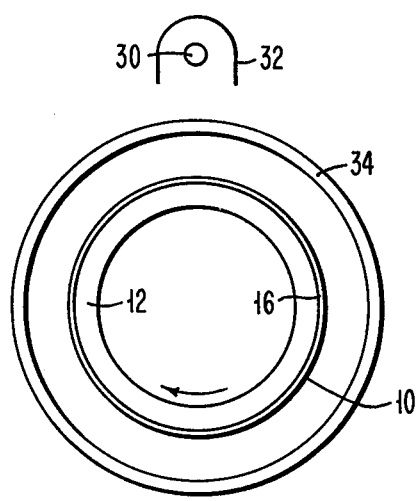
FIG. 2 is a schematic view of the apparatus for irradiating the roll surface with ultra-violet radiation.

The apparatus for providing the treating step is shown in FIG. 2. The roll 10 is placed in a suitable fixture (not shown) so that the roll 10 can be continuously rotated about its axis as shown by the arrow in the drawing to provide relative motion between the radiation source and the peripheral surface of the roll. The rotation is preferably at a low speed and is not critical. In some cases it may be advantageous to provide the relative motion by moving the radiation source. As the roll is rotating, its outer peripheral surface is irradiated with a low level ultra-violet radiation provided by a suitable source such as a mercury arc lamp 30. A reflector 32 is preferably provided to direct the radiation toward the roll 10. The surface of the roll 10 is kept in an inert atmosphere during the treating step under some conditions. The inert atmosphere is provided since the UV radiation in the presence of oxygen may produce ozone, which poisons the silicone rubber coating. In the examples previously discussed, the low level radiation treatment requires the inert atmosphere during treatment, but the medium pressure UV treatment does not require the inert atmosphere during treatment. The reason that the inert atmosphere is not required for the medium pressure treatment is either that the spectral output of the medium pressure lamps used does not generate ozone or that the heat generated by the lamp breaks down the ozone as quickly as it is formed. A cylindrical member 34 is mounted in a fixed position surrounding the roll to confine the inert atmosphere. Cylindrical member 34 is made from a suitable material that is transparent to the ultra-violet radiation. The preferred material is a quartz tube. The inert atmosphere is provided by filling the area between roll 10 and the inner peripheral surface of cylindrical tube member 34 with a suitable inert atmosphere. The preferred inert atmosphere is nitrogen and the nitrogen is present in sufficient quantity to provide a flow of about ten cubic feet per hour in the area between the heated roll and the tube 34. The low level ultra-violet radiation is produced for a predetermined time at a low level. For a specific roll and using a Pen Ray lamp number 3SC-9 and a General Electric type 208 quartz tube, the preferred exposure is four milliwats per centimeter squared when measured at the 254 nanometer line of the spectrum from the lamp 30, and this level of radiation is produced for an exposure time of six hours with the roll 10 rotating about its axis at a speed of approximately 50 RPM. This level of exposure and timing produces a fuser roll which not only inhibits the formation of toner rings for a substantial time as shown in FIG. 5, but also produces about one-third lower wear rate.

The reasons for this improved performance due to the described treatment is not fully understood, but lowering the tack of the rolls appears to contribute to the results. One theory for the improved performance is that the prior art rolls were not fully cured, and this is the reason that the paper sizing material, the paper dust and the toner finally combined to produce the toner rings. However, this does not appear to be the correct theory since the silicone rubber coating of the prior art rolls was fully cured by all the conventional tests, such as modulus of elasticity, tensile strength, elongation and cross-link density. In addition, the problem seems to be present with all curing methods.

Another theory is that for some unknown reason the silicone rubber coating on the prior art rolls was not cured well on the surface. However, this also does not appear to be the proper explanation since the heated roll starts out with a coating of silicone rubber about 10 mils thick. This thickness is reduced by abrasive wear during use and with a roll prepared according to the present invention, the beneficial effect is still apparent with a few mils wear on the roll. This indicates that the explanation is not a surface phenomena since no surface phenomena would be present a substantial depth into the coating.

While the invention has been particularly shown and described with reference to a preferred embodiment thereof, it will be understood by those skilled in the art that various changes in the form and details may be made therein without departing from the spirit and scope of the invention.

What is claimed is:

1. The method of manufacturing a contact heat fuser roll for fixing a resinous powder image to a substrate comprising the steps of:

forming a thin film of an uncured silicone rubber material on the peripheral surface of a nondeformable base member;

curing the silicone rubber material on said base member; and treating the cured silicone rubber material on said base member by irradiating its surface with a uniform predetermined low level of ultra-violet radiation for a predetermined time between about two and ten hours to produce a contact heat fuser roll having a thin deformable layer of silicone rubber of predetermined softness on its peripheral surface.

2. The method of claim 1 wherein said ultra-violet radiation is produced by a low pressure mercury arc lamp.

3. The method of claim 2 wherein said treating step is carried out in an inert atmosphere.

4. The method of claim 3 wherein said inert atmosphere comprises nitrogen.

5. The method of claim 4 in which said ultra-violet radiation is produced at a level of about 4 milliwatts per centimeter squared and said predetermined time is about 6 hours.

6. The method of manufacturing a contact heat fuser roll for fixing a resinous powder image to a substrate comprising the steps of:

forming a thin film of an uncured silicone rubber material on the outer peripheral surface of a nondeformable cylindrical member;

curing the silicone rubber material on said cylindrical member; and producing relative motion between said cylindrical member and a uniform ultra-violet radiation source of a predetermined low level while simultaneously irradiating the cured silicone rubber material on the outer peripheral surface of said cylindrical member with ultra-violet radiation from said source for a predetermined time between about two and ten hours to produce a contact heat fuser roll having a thin deformable layer of silicone rubber of predetermined softness on its outer peripheral surface.

7. The method of claim 6 wherein said relative motion is produced by rotating said cylindrical member about its axis.

8. The method of claim 6 wherein said ultra-violet radiation source comprises a low pressure mercury arc lamp.

9. The method of claim 8 wherein the irradiation of the surface of said cylindrical member is carried out in an inert atmosphere.

10. The method of claim 9 wherein said inert atmosphere comprises nitrogen.

11. The method of claim 10 in which said predetermined level of ultra-violet radiation is about 4 milliwatts per centimeter squared and said predetermined time is about 6 hours.

12. As an article of manufacture, a fuser roll prepared in accordance with the method of claim 1.

* * * * *